US008931058B2

(12) United States Patent
DiChiara et al.

(10) Patent No.: US 8,931,058 B2
(45) Date of Patent: Jan. 6, 2015

(54) SYSTEMS AND METHODS FOR PERMISSION ARBITRATED TRANSACTION SERVICES

(75) Inventors: Christer J. DiChiara, San Diego, CA (US); Kristin M. LeFevre, Orange, CA (US); Randall P. Mitchum, Tustin, CA (US); Bryan David Wresinski, Signal Hill, CA (US)

(73) Assignee: Experian Information Solutions, Inc., Costa Mesa, CA (US)

( * ) Notice: Subject to any disclaimer, the term of this patent is extended or adjusted under 35 U.S.C. 154(b) by 88 days.

(21) Appl. No.: 13/175,401

(22) Filed: Jul. 1, 2011

(65) Prior Publication Data

US 2012/0017266 A1 Jan. 19, 2012

Related U.S. Application Data

(60) Provisional application No. 61/360,904, filed on Jul. 1, 2010.

(51) Int. Cl.

*G06F 21/00* (2013.01)
*H04L 29/06* (2006.01)
*G06F 17/30* (2006.01)

(52) U.S. Cl.

CPC ............... *H04L 63/126* (2013.01); *H04L 63/10* (2013.01)
USPC ................... 726/4; 726/12; 726/26; 713/182; 705/1; 705/27.1; 705/38; 709/204

(58) Field of Classification Search

USPC ........ 726/4, 12, 26; 713/182; 705/27.1, 38, 1; 709/204
See application file for complete search history.

(56) References Cited

U.S. PATENT DOCUMENTS 4,795,890 A 1/1989 Goldman
4,977,595 A 12/1990 Ohta et al.

(Continued)

FOREIGN PATENT DOCUMENTS

EP 1028401 A2 8/2000
WO WO 99/60481 11/1999

(Continued)

OTHER PUBLICATIONS

Aharony, N. ; Reed, D.P. ; Lippman, Andrew; "Social Area Networks: Data Networking of the People, by the People, for the People"; Computational Science and Engineering, 2009. CSE '09. International Conference on Volume: 4; DOI: 10.1109/CSE.2009.341; Publication Year: May 2009 , pp. 1148-1155.*

(Continued)

*Primary Examiner* — Andrew Nalven
*Assistant Examiner* — Courtney Fields
(74) *Attorney, Agent, or Firm* — Knobbe Martens Olson & Bear LLP

(57) ABSTRACT

Systems and methods disclosed allow a permitting party to share personal information with a receiving party. The receiving party may use the information to authenticate the permitting party, assess the permitting party, determine if the permitting party is compatible with one or more other users associated with the receiving party, or validate the permitting party. The permitting party may define how much of the permitting party's personal information is shared, and/or limit the use of the information for one or more specific purposes. A requesting party may also set up criteria for the types of information it wants to review along with the intended use of the information. The systems and methods disclosed also enables permitting parties the ability to grant requesting parties access to requested information.

22 Claims, 6 Drawing Sheets

100
COMPUTING SYSTEM
MASS STORAGE DEVICE 120
CENTRAL PROCESSING UNIT (CPU) 105
PERMISSION ARBITRATED TRANSACTION SERVICES MODULE 150
I/O INTERFACES AND DEVICES 110
MULTIMEDIA DEVICES 140
MEMORY 130
180
115
PERMITTING PARTY(IES) 190
RECEIVING PARTY(IES) 184
NETWORK 160
REQUESTING PARTY(IES) 164
NETWORK 161
INTERNAL DATA STRUCTURE(S) 172
EXTERNAL DATA STRUCTURE(S) 173

(56) References Cited

U.S. PATENT DOCUMENTS 5,351,293 A 9/1994 Michener et al.
5,590,038 A 12/1996 Pitroda
5,640,577 A 6/1997 Scharmer
5,715,314 A 2/1998 Payne et al.
5,754,939 A 5/1998 Herz et al.
5,828,837 A 10/1998 Eikland
5,844,218 A 12/1998 Kawan et al.
5,903,830 A 5/1999 Joao et al.
5,956,693 A 9/1999 Geerlings
5,961,593 A 10/1999 Gabber et al.
5,990,038 A 11/1999 Suga et al.
5,999,596 A 12/1999 Walker et al.
6,021,943 A 2/2000 Chastain
6,038,551 A 3/2000 Barlow et al.
6,072,894 A 6/2000 Payne
6,073,106 A 6/2000 Rozen et al.
6,253,202 B1 6/2001 Gilmour
6,254,000 B1 7/2001 Degen et al.
6,263,447 B1 7/2001 French et al.
6,269,369 B1 7/2001 Robertson
6,282,658 B2 8/2001 French et al.
6,321,339 B1 11/2001 French et al.
6,327,578 B1 12/2001 Linehan
6,463,533 B1 10/2002 Calamera et al.
6,473,740 B2 10/2002 Cockril et al.
6,496,936 B1 12/2002 French et al.
6,581,059 B1 6/2003 Barrett et al.
6,601,173 B1 7/2003 Mohler
6,714,944 B1 3/2004 Shapiro et al.
6,734,886 B1 5/2004 Hagan et al.
6,750,985 B2 6/2004 Rhoads
6,754,665 B1 6/2004 Futagami et al.
6,766,946 B2 7/2004 Iida et al.
6,804,346 B1 10/2004 Mewhinney
6,845,448 B1 1/2005 Chaganti et al.
6,857,073 B2 2/2005 French et al.
6,907,408 B2 6/2005 Angel
6,908,030 B2 6/2005 Rajasekaran et al.
6,910,624 B1 6/2005 Natsuno
6,934,858 B2 8/2005 Woodhill
6,950,858 B2 9/2005 Ogami
6,983,379 B1 1/2006 Spalink et al.
6,983,381 B2 1/2006 Jerdonek
6,985,887 B1 1/2006 Sunstein et al.
6,988,085 B2 1/2006 Hedy
7,028,013 B2 4/2006 Saeki
7,059,531 B2 6/2006 Beenau et al.
7,121,471 B2 10/2006 Beenau et al.
7,154,375 B2 12/2006 Beenau et al.
7,234,156 B2 6/2007 French et al.
7,234,160 B2 6/2007 Vogel et al.
7,237,267 B2 6/2007 Rayes et al.
7,246,067 B2 7/2007 Austin et al.
7,303,120 B2 12/2007 Beenau et al.
7,310,611 B2 12/2007 Shibuya et al.
7,314,167 B1 1/2008 Kiliccote
7,343,149 B2 3/2008 Benco
7,389,913 B2 6/2008 Starrs
7,433,864 B2 10/2008 Malik
7,444,414 B2 10/2008 Foster et al.
7,451,113 B1 11/2008 Kasower
7,460,857 B2 12/2008 Roach, Jr.
7,478,157 B2 1/2009 Bohrer et al.
7,490,356 B2 2/2009 Lieblich et al.
7,503,489 B2 3/2009 Heffez
7,509,117 B2 3/2009 Yum
7,529,698 B2 5/2009 Joao
7,548,886 B2 6/2009 Kirkland et al.
7,575,157 B2 8/2009 Barnhardt et al.
7,581,112 B2 8/2009 Brown et al.
7,587,366 B2 9/2009 Grim, III et al.
7,603,701 B2 10/2009 Gaucas
7,606,725 B2 10/2009 Robertson et al.
7,620,596 B2 11/2009 Knudson et al.
7,623,844 B2 11/2009 Herrmann et al.
7,653,600 B2 1/2010 Gustin
7,689,487 B1 3/2010 Britto et al.
7,689,505 B2 3/2010 Kasower
7,690,032 B1 3/2010 Peirce
7,698,445 B2 4/2010 Fitzpatrick et al.
7,708,190 B2 5/2010 Brandt et al.
7,739,139 B2 6/2010 Robertson et al.
7,747,494 B1 6/2010 Kothari et al.
7,761,384 B2 7/2010 Madhogarhia
7,761,568 B1 7/2010 Levi et al.
7,765,311 B2 7/2010 Itabashi et al.
7,769,696 B2 8/2010 Yoda
7,769,697 B2 8/2010 Fieschi et al.
7,774,270 B1 8/2010 MacCloskey
7,797,725 B2 9/2010 Lunt et al.
7,802,104 B2 9/2010 Dickinson
7,827,115 B2 11/2010 Weller et al.
7,841,008 B1 11/2010 Cole et al.
7,849,014 B2 12/2010 Erikson
7,853,493 B2 12/2010 DeBie et al.
7,865,958 B2 1/2011 Lieblich et al.
7,970,679 B2 6/2011 Kasower
7,979,908 B2 7/2011 Millwee
8,060,424 B2 11/2011 Kasower
8,095,458 B2 1/2012 Peterson et al.
8,127,986 B1 3/2012 Taylor et al.
8,195,549 B2 6/2012 Kasower
8,234,498 B2 * 7/2012 Britti et al. .................... 713/182
8,355,967 B2 1/2013 Debie et al.
8,442,886 B1 5/2013 Haggerty et al.
8,515,844 B2 8/2013 Kasower
8,606,694 B2 12/2013 Campbell et al.
8,744,956 B1 6/2014 DiChiara et al.
2001/0001877 A1 5/2001 French et al.
2001/0049620 A1 12/2001 Blasko
2002/0004736 A1 1/2002 Roundtree et al.
2002/0026519 A1 2/2002 Itabashi et al.
2002/0035684 A1 3/2002 Vogel et al.
2002/0069122 A1 6/2002 Yun et al.
2002/0091650 A1 7/2002 Ellis
2002/0099635 A1 7/2002 Guiragosian
2002/0111816 A1 8/2002 Lortscher et al.
2002/0128962 A1 9/2002 Kasower
2002/0157029 A1 10/2002 French et al.
2002/0169747 A1 11/2002 Chapman et al.
2002/0198824 A1 12/2002 Cook
2003/0009418 A1 1/2003 Green et al.
2003/0009426 A1 1/2003 Ruiz-Sanchez
2003/0061163 A1 3/2003 Durfield
2003/0097342 A1 5/2003 Whittingtom
2003/0163416 A1 8/2003 Kitajima
2003/0177028 A1 9/2003 Cooper et al.
2003/0182214 A1 9/2003 Taylor
2004/0006488 A1 1/2004 Fitall et al.
2004/0015714 A1 1/2004 Abraham et al.
2004/0044739 A1 3/2004 Ziegler
2004/0078324 A1 4/2004 Lonnberg et al.
2004/0123162 A1 6/2004 Antell et al.
2004/0138994 A1 7/2004 DeFrancesco et al.
2004/0139025 A1 7/2004 Coleman
2004/0153521 A1 8/2004 Kogo
2004/0158523 A1 8/2004 Dort
2004/0243518 A1 12/2004 Clifton et al.
2004/0243832 A1 12/2004 Wilf et al.
2005/0005168 A1 1/2005 Dick
2005/0027995 A1 2/2005 Menschik et al.
2005/0055231 A1 3/2005 Lee
2005/0097320 A1 5/2005 Golan et al.
2005/0144452 A1 6/2005 Lynch et al.
2005/0154664 A1 7/2005 Guy et al.
2005/0166262 A1 7/2005 Beattie et al.
2005/0216582 A1 9/2005 Toomey et al.
2005/0256809 A1 11/2005 Sadri
2005/0273442 A1 12/2005 Bennett et al.
2006/0010487 A1 1/2006 Fierer et al.
2006/0032909 A1 2/2006 Seegar
2006/0036870 A1 2/2006 Dasari et al.
2006/0059110 A1 3/2006 Madhok et al.
2006/0074986 A1 4/2006 Mallalieu et al.

(56) References Cited

U.S. PATENT DOCUMENTS

2006/0080263 A1 4/2006 Willis et al.
2006/0129481 A1 6/2006 Bhatt et al.
2006/0131390 A1 6/2006 Kim
2006/0155573 A1* 7/2006 Hartunian .......................... 705/1
2006/0161435 A1 7/2006 Atef et al.
2006/0173776 A1 8/2006 Shalley et al.
2006/0178971 A1 8/2006 Owen et al.
2006/0184440 A1 8/2006 Britti
2006/0204051 A1 9/2006 Holland et al.
2006/0218407 A1 9/2006 Toms
2006/0239512 A1 10/2006 Petrillo
2006/0262929 A1 11/2006 Vatanen et al.
2006/0265243 A1 11/2006 Racho et al.
2006/0271456 A1 11/2006 Romain et al.
2006/0271457 A1 11/2006 Romain et al.
2006/0277092 A1 12/2006 Williams
2007/0005508 A1 1/2007 Chiang
2007/0022297 A1 1/2007 Britti
2007/0038483 A1 2/2007 Wood
2007/0038497 A1 2/2007 Britti
2007/0124256 A1 5/2007 Crooks et al.
2007/0130070 A1 6/2007 Williams
2007/0174186 A1 7/2007 Hokland
2007/0244807 A1 10/2007 Andringa et al.
2007/0250459 A1 10/2007 Schwarz et al.
2007/0261114 A1 11/2007 Pomerantsev
2007/0288360 A1* 12/2007 Seeklus ........................... 705/38
2008/0010206 A1 1/2008 Coleman
2008/0010687 A1 1/2008 Gonen et al.
2008/0033742 A1 2/2008 Bernasconi
2008/0052244 A1 2/2008 Tsuei et al.
2008/0066188 A1 3/2008 Kwak
2008/0071682 A1 3/2008 Dominguez
2008/0077526 A1 3/2008 Arumugam
2008/0086759 A1 4/2008 Colson
2008/0103800 A1 5/2008 Domenikos et al.
2008/0109875 A1 5/2008 Kraft
2008/0114670 A1 5/2008 Friesen
2008/0115191 A1 5/2008 Kim et al.
2008/0126233 A1 5/2008 Hogan
2008/0162317 A1 7/2008 Banaugh et al.
2008/0175360 A1 7/2008 Schwarz et al.
2008/0183480 A1 7/2008 Carlson et al.
2008/0195548 A1 8/2008 Chu et al.
2008/0205655 A1 8/2008 Wilkins et al.
2008/0208873 A1 8/2008 Boehmer
2008/0255992 A1 10/2008 Lin
2008/0263058 A1 10/2008 Peden
2008/0270209 A1 10/2008 Mauseth
2008/0281737 A1 11/2008 Fajardo
2008/0288283 A1 11/2008 Baldwin, Jr. et al.
2008/0288299 A1 11/2008 Schultz
2008/0306750 A1 12/2008 Wunder et al.
2008/0319889 A1 12/2008 Hammad
2009/0031426 A1 1/2009 Dal Lago et al.
2009/0037332 A1 2/2009 Cheung et al.
2009/0043691 A1 2/2009 Kasower
2009/0055894 A1 2/2009 Lorsch
2009/0094674 A1 4/2009 Schwartz et al.
2009/0106141 A1 4/2009 Becker
2009/0106150 A1 4/2009 Pelegero et al.
2009/0138335 A1 5/2009 Lieberman
2009/0144166 A1 6/2009 Dickelman
2009/0150166 A1 6/2009 Leite et al.
2009/0150238 A1 6/2009 Marsh et al.
2009/0177529 A1 7/2009 Hadi
2009/0177562 A1 7/2009 Peace et al.
2009/0199264 A1 8/2009 Lang
2009/0210241 A1 8/2009 Calloway
2009/0254476 A1 10/2009 Sharma et al.
2009/0254971 A1 10/2009 Herz et al.
2009/0260064 A1 10/2009 Mcdowell et al.
2009/0307778 A1 12/2009 Mardikar
2009/0328173 A1 12/2009 Jakobson et al.
2010/0011428 A1 1/2010 Atwood et al.
2010/0030677 A1 2/2010 Melik-Aslanian et al.
2010/0043055 A1 2/2010 Baumgart
2010/0049803 A1* 2/2010 Ogilvie et al. ................ 709/204
2010/0100945 A1 4/2010 Ozzie et al.
2010/0114744 A1 5/2010 Gonen
2010/0114747 A1 5/2010 Kasower
2010/0114776 A1 5/2010 Weller et al.
2010/0121767 A1 5/2010 Coulter et al.
2010/0145836 A1 6/2010 Baker et al.
2010/0179906 A1 7/2010 Hawkes
2010/0205662 A1 8/2010 Ibrahim et al.
2010/0229245 A1 9/2010 Singhal
2010/0241535 A1 9/2010 Nightengale et al.
2010/0250411 A1 9/2010 Ogrodski
2010/0280914 A1 11/2010 Carlson
2010/0299262 A1 11/2010 Handler
2010/0325694 A1 12/2010 Bhagavatula et al.
2010/0332393 A1 12/2010 Weller et al.
2011/0016533 A1 1/2011 Zeigler et al.
2011/0035788 A1 2/2011 White et al.
2011/0161218 A1 6/2011 Swift
2011/0184838 A1* 7/2011 Winters et al. ............... 705/27.1
2012/0066084 A1 3/2012 Sneyders
2012/0108274 A1 5/2012 Acebo Ruiz et al.
2013/0018811 A1 1/2013 Britti et al.
2013/0031624 A1 1/2013 Britti et al.
2013/0211986 A1 8/2013 Debie et al.
2013/0332342 A1 12/2013 Kasower

FOREIGN PATENT DOCUMENTS

WO WO 00/30045 5/2000
WO WO 01/84281 11/2001
WO WO 2009117468 A3 * 1/2010

OTHER PUBLICATIONS http://www.creditsesame.com/credit-badge/ accessed on Dec. 2, 2011.

http://www.creditsesame.com/how-we-help/faqs/#cb accessed on Dec. 5, 2011.

Ettore, Paul Kahn on Exceptional Marketing. Management Review, vol. 38(11), Nov. 1994, pp. 48-51.

Ideon, Credit-Card Registry that Bellyflopped this Year, Is Drawing some Bottom-Fishers, The Wall Street Journal, Aug. 21, 1995, pp. C2.

Li et al., "Automatic Verbal Information Verification for User Authentication", IEEE Transactions on Speech and Audio Processing, vol. 8, No. 5, Sep. 2000, pp. 585-596.

* cited by examiner

SYSTEMS AND METHODS FOR PERMISSION ARBITRATED TRANSACTION SERVICES

CROSS-REFERENCE TO RELATED APPLICATION

This application claims the benefit of U.S. Provisional Application No. 61/360,904, filed Jul. 1, 2010 and titled SYSTEMS AND METHODS FOR PERMISSION ARBITRATED TRANSACTION SERVICES, the disclosure of which is hereby incorporated by reference in its entirety into this application.

BACKGROUND

This disclosure generally relates to accessing personal information, and more particularly to systems and methods for permission arbitrated transaction services relating to personal information.

BRIEF DESCRIPTION OF THE DRAWINGS

Specific embodiments will now be described with reference to the following drawings.

FIG. 2A illustrates a first portion of the method, based on an initiation by a requesting party, FIG. 2B illustrates the first portion of the method based on an initiation by a permitting party, FIG. 2C is illustrates a second portion of the embodiment of a method of arbitrating access to personal information.

DESCRIPTION OF THE EMBODIMENTS

The terminology used in the description presented herein is not intended to be interpreted in any limited or restrictive manner, simply because it is being utilized in conjunction with a detailed description of certain specific embodiments of the invention. Furthermore, embodiments of the invention may include several novel features, no single one of which is solely responsible for its desirable attributes or which is essential to practicing the inventions described herein.

Example Computing System

Figure 1:
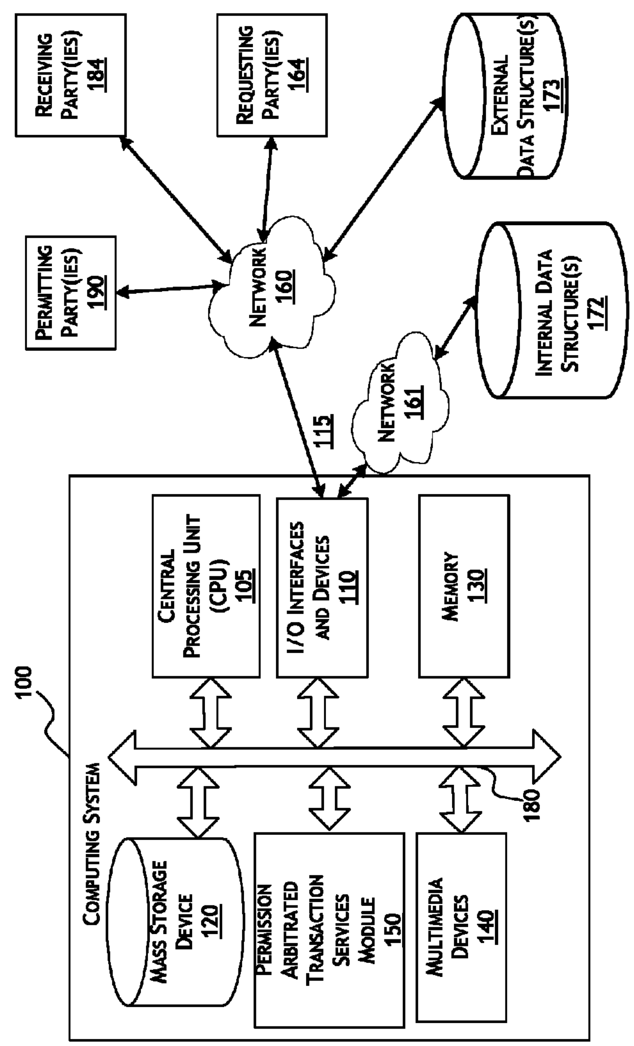
FIG. 1 illustrates one embodiment of a block diagram of a computer system for arbitrating access to personal information.

In some embodiments, the systems, computer clients and/or servers described below take the form of a computing system as shown in FIG. 1. FIG. 1 is a block diagram showing an embodiment in which the computing system 100 is in communication with a network 160 and various systems are also in communication with the network 160. The computing system 100 may be used to implement systems and methods described herein. For example, the computing system 100 may be configured to receive requests for personal information and generate outputs corresponding to the type of information requested. In some embodiments, the system is accessed remotely by a client, the system is local to the client, and/or a combination of the two. One example client may be an individual or a business that uses the systems and methods to request access to another individual's personal information, such as information that is indicative of character attributes of the individual.

The terms "individual," "consumer," "customer," "people," "persons," "party," "entity," and the like, whether singular or plural, should be interpreted to include either individuals or groups of individuals, such as, for example, married couples or domestic partners, organizations, groups, business entities, and other entities.

The computing system 100 includes, for example, a personal computer that is IBM, Macintosh, or Linux/Unix compatible. In one embodiment, the computing system 100 comprises a server, a laptop computer, a cell phone, a personal digital assistant, a kiosk, or an audio player, for example. In one embodiment, the exemplary computing system 100 includes a central processing unit (CPU) 105, which may include a conventional microprocessor. The computing system 100 further includes a memory 130, such as random access memory (RAM) for temporary storage of information and a read only memory (ROM) for permanent storage of information, and a mass storage device 120, such as a hard drive, diskette, or optical media storage device. Typically, the modules of the computing system 100 are connected to the computer using a standard based bus system 180. In different embodiments, the standard based bus system 180 could be Peripheral Component Interconnect (PCI), Microchannel, Small Computer System Interface (SCSI), Industrial Standard Architecture (ISA) and Extended ISA (EISA) architectures, for example. In addition, the functionality provided for in the components and modules of the computing system 100, which is also referred to herein as the permission arbitrated transaction services system 100 or simply the PATS system 100, may be combined into fewer components and modules or further separated into additional components and modules.

The computing system 100 is generally controlled and coordinated by operating system software, such as Windows 95, Windows 98, Windows NT, Windows 2000, Windows XP, Windows Vista, Unix, Linux, SunOS, Solaris, or other compatible operating systems. In Macintosh systems, the operating system may be any available operating system, such as MAC OS X. In other embodiments, the computing system 100 may be controlled by a proprietary operating system. Conventional operating systems control and schedule computer processes for execution, perform memory management, provide file system, networking, I/O services, and provide a user interface, such as a graphical user interface (GUI), among other things.

The exemplary computing system 100 includes one or more commonly available input/output (I/O) devices and interfaces 110, such as a keyboard, mouse, touchpad, and printer. In one embodiment, the I/O devices and interfaces 110 include one or more display device, such as a monitor, that allows the visual presentation of data to a user. More particularly, a display device provides for the presentation of GUIs, application software data, and multimedia presentations, for example. The computing system 100 may also include one or more multimedia devices 140, such as speakers, video cards, graphics accelerators, and microphones, for example.

In the embodiment of FIG. 1, the I/O devices and interfaces 110 provide a communication interface to various external devices. In the embodiment of FIG. 1, the computing system 100 is electronically coupled to a network 160, which comprises one or more of a LAN, WAN, or the Internet, for example, via a wired, wireless, or combination of wired and wireless, communication link 115. The network 160 communicates with various computing devices and/or other electronic devices via wired or wireless communication links.

In addition to the devices that are illustrated in FIG. 1, the network 160 may communicate with other data sources or other computing devices. In addition, the data sources may include one or more internal and/or external data sources. In some embodiments, one or more of the data structures or data sources may be implemented using a relational database, such as Sybase, Oracle, CodeBase and Microsoft® SQL Server as well as other types of data structures such as, for example, a flat file data structure, an entity-relationship data structure, and object-oriented data structure, and/or a record-based data structure.

In the embodiment of FIG. 1, the computing system 100 is coupled to a secured network 160, such as a secured LAN, for example. The system communicates with the internal data structure(s) 172 and external data structure(s) 173. In some embodiments, the system 100 may communicate with the internal data structure 172 via a secured network 161, such as a secured LAN. In some embodiments, the internal data structure(s) 172 and the external data structure 173 may be configured to communicate with additional computing devices over the networks 160, 161 and/or some other network, such as a LAN, WAN, or the Internet via a wired, wireless, or combination of wired and wireless, communication link.

In the embodiment of FIG. 1, the computing system 100 also includes a permission arbitrated transactions services ("PATS") module 150 that may be executed by the CPU 105. For example, the computing system 100 may be configured to execute the PATS module 150, among others, in order to provide information based on data in internal data structure(s) 172 and/or external data structure(s) 173, as explained in further detail below. The sources of the data accessed may include consumer information available to a credit bureau such as credit profile data, demographic data, marketing data, credit scores, marketing scores, behavioral scores, inferred data, and the like, and any third party data to which the credit bureau may have access. The sources of data may also include consumer-provided data such as preferences, interests, affinity, desires, behavioral data, transactional data such as purchases, and any other self-defined or personally created data. In various embodiments, such data may be available on one or more of the internal data structure(s) 172 and/or external data structure(s) 173.

FIG. 1 also illustrates a requesting party 164 that is in communication with the network 160. The requesting party may be any entity that desires information regarding another entity. For example, a landlord may be a requesting party that desires information regarding potential tenants. In one embodiment, the computing system 100 provides an arbitration service between requesting parties and parties from which personal information is requested. For example, the requesting party 164 may request data related to another entity (a permitting party 190). The permitting party 190 may provide permission to the computing system 100 to grant the requesting party 164 access to certain information regarding the permitting party. As another example, the permitting party 190 may provide permission to the computing system 100 to make information available to a receiving party 184, without the receiving party 184 first requesting access to the information. Thus, the permitting party 190 can selectively allow personal information to be provided to various entities in response to specific requests for information (e.g., in response to a request from the requesting party 164) or without requests from parties (e.g., information may be made available to the requesting party 164). In various embodiments, some of the parties 164, 184 and 190 may overlap with one another. In various embodiments, the receiving party 184 may include various types of entities. For example, the receiving party 184 may also be the permitting party 190 (for example, a consumer may provide authorization rules that permit sending of personal information to the consumer on a periodic basis), a third party distinct the permitting party 190, a credit bureau, an information service provider, a financial institution, or a party that stores and maintains personal information on the permitting party 190. Depending on the embodiment, the parties 190, 164 and 184 may be unknown/anonymous to each other. In yet other embodiments, the parties 190, 164 and 184 may be partially known to each other, such as through a user name or a screen name on a social networking site, or a URL name, for example. In general, the word "module," as used herein, refers to logic embodied in hardware or firmware, or to a collection of software instructions, possibly having entry and exit points, written in a programming language, such as, for example, Java, Lua, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules described herein are preferably implemented as software modules, but may be represented in hardware or firmware. Generally, the modules described herein refer to logical modules that may be combined with other modules or divided into sub-modules despite their physical organization or storage.

It is recognized that the term "remote" may include data, objects, devices, components, and/or modules not stored locally, that is not accessible via the local bus. Thus, remote data may include a device which is physically stored in the same room and connected to the computing system via a network. In other situations, a remote device may also be located in a separate geographic area, such as, for example, in a different location, country, and so forth.

In one embodiment, the computing system 100 may allow a user, also referred to as the permitting party 190, to share the user's personal information with another party, such as the receiving party 184. The receiving party 184 may then use the information to authenticate the permitting party 190, assess information associated with the permitting party 190, determine if the permitting party 190 is compatible with one or more other users associated with the receiving party 184, validate the permitting party 190, and so forth. The permitting party 190 may define how much of the permitting party 190's personal information is shared, and/or limit the use of the information for one or more specific purposes. Personal information may include any information associated with an entity, such as information that may be used for purpose of one or more of authentication, assessment, compatibility, legitimacy and validation. Requesting parties and/or receiving parties may also request, and be provided access to via the computing system 100, non-personal aggregate attributes, such as for the purpose of enabling the use of summarized attributes in areas such as website advertising, for example.

Similarly, a requesting party 164 may set up criteria for the types of information it wants to review along with the intended use of the information. The requesting party 164 may also provide a system that enables permitting parties 190 the ability to grant the requesting party 164 access to the requested information. This access may be direct or via a gateway.

As one example, a requesting party 164 may be the Smith family, which is looking to hire a home nurse to watch over the family's aging grandmother. The Smith family can then decide that it would like to review credit information, criminal background information, and general demographic information of potential home nurse applicants. One such potential home nurse applicant may be Jane Jones. The Smith family may provide information to the computing system 100, and more particularly, to the PATS module 150, requesting certain personal information regarding Jane Jones. For example, the Smith family may access a website that is controlled by the provider of the PATS module 150 in order to provide a request for information regarding Jane Jones. The requested may be provided via any available user interface elements, and may include various options for payment for provision of the personal information. Alternatively, the request for information regarding an individual may be communicated to the computing system 100 in any other manner, such as via SMS message, email message, phone call, letter, or other In this embodiment, Jane Jones, a home health nurse, who is looking for a new patient, is the permitting party 190, that is provided an opportunity to permit the Smith family (the requesting party 164) to access certain of her personal information. In one embodiment, Ms. Jones is notified of a request for personal information in one or more of various manners, such as an SMS message, email message, letter, phone call, or an alert in an online portal, such as a credit monitoring portal of which Mr. Jones is a member. Thus, Jane Jones can utilize the system 100 to permit the Smith family to review her personal information, and the Smith family can use the system 100 to determine that Jane Jones is looking for a new patient, receive information verifying whether Jane Jones is who she says she is, and receive information from the computing system 100 about Jane Jones' credit history, criminal background and/or any other requested information.

As another example, nurse Jack Brown may be another nurse looking for potential patients to take care of. As the permitting party 190, Jack Brown may provide information to the computing system 100, and more particularly, to the PATS module 150, indicating agreement to make certain of his personal information, such as his credit history and criminal background information, available to certain receiving parties 184, which may be families looking to hire a home nurse. Thus, Jack Brown can utilize the system 100 to permit receiving parties 184 to review his personal information. One such family, the Doe family, which is qualified as a receiving party 184 based on criteria provided by Jack Brown (the permitting party 190), can access information over a network 160 to determine that Jack Brown is looking for a new patient and receive information from the computing system 100 about Jack Brown's credit history and criminal background.

Credit data as well as public records, demographics such as, for example, age, and aggregated attributes relating to credit data may be enabled for scalable distribution into digital and non-digital platforms. Permission arbitrated transaction services systems and methods disclosed herein may enable such scalable distribution through various web properties, utilizing permission-based handshakes, an open web framework and/or architecture, transformation layers and authentication rules. Website developers or others may utilize an API/SDK framework to write to the computing system 100. Such a PATS system 100 may accept common request and delivery types such as XML (world-wide web), SMS (mobile technology), and the like, over secure channels (such as https for example), using common web services (such as REST and SOAP, for example).

Embodiments of the permission arbitrated transaction services systems and methods may leverage a variety of possible interactions between parties to present potential opportunities for character and personal assessment between two or more parties 164, 184 and 190. Some example interactions include tenant screening, social networks and matchmaking, hiring and employment, electronic exchanges, searching for caregivers, client screening, background checks. Credit data as well as public records, demographics such as, for example, age, and aggregated attributes relating to credit data may be transformed, using the permission arbitrated transaction services ("PATS") system 100, into a broad consumable language where required, in order to provide parties with new standards for assessment of other parties' character, compatibility, employability, and the like. In various embodiments, the PATS system may be operated by a credible and trusted entity acting as an arbitrator between the various parties. In some embodiments, the PATS system may be operated by a credit bureau.

Some embodiments of the permission arbitrated transaction services systems and methods may also enable entities, such as small business owners, with a simplified mechanism for accessing personal information of entities. Typically, business owners undergo extensive verification processes (including site visits for example) in order to be authorized to access credit data. The permission arbitrated transaction services may speed up this process by performing the necessary validation electronically and/or online in real-time to allow the small business owners quicker access to credit data.

Embodiments of the PATS system 100 may be implemented as a data-as-a-service model. Such a model includes standardized processes for accessing data "where it lives"—the actual platform on which the data resides does not matter. For data-as-a-service, the consumption of resources may be determined by the buyer/customer/user on an as-needed basis, and may utilize web services or cloud computing. Applications and methods of access to a data-as-a-service model may vary depending on the type of information requested, primarily due to statutory requirements and governing regulations relating to the information.

The table below lists some of the potential features of a PATS system 100.

TABLE 1

| Market | Major Features | Platform | Client Interface | Server | Pricing Model |
|---|---|---|---|---|---|
| US Consumers/Businesses digital networks, social networks, employment sites, | Data-as-a-service platform and application layer(s) to enable aggregated statistics | Web services/custom solutions | Browser application and/or XML | Web server | Transaction and Revenue Share |

TABLE 1-continued

| Market | Major Features | Platform | Client Interface | Server | Pricing Model |
|---|---|---|---|---|---|
| match making sites, and similar | and permission actuated access for assessments of authentication, legitimacy, and character/background (P2P, B2C, Web) | | integration | | |

Figure 2A:
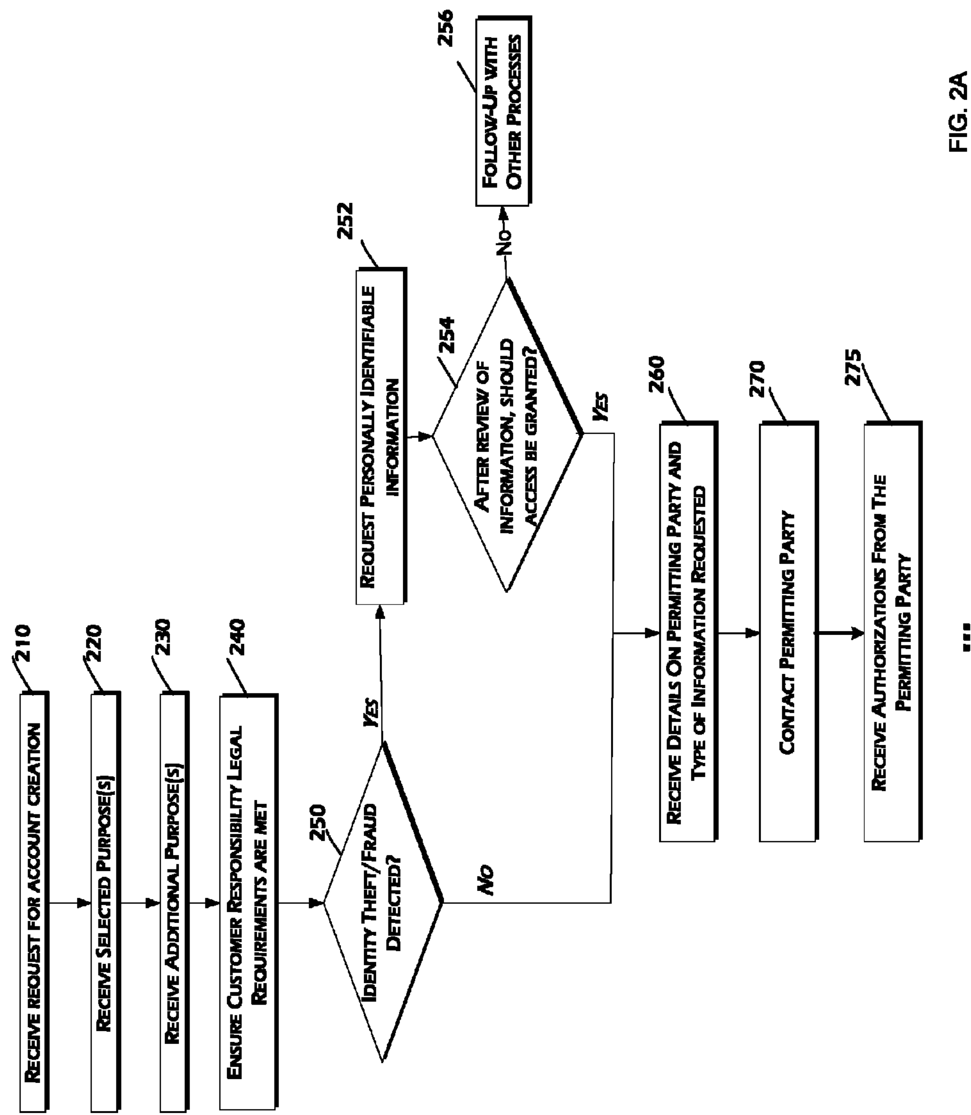
FIGS. 2A-2C are flowcharts illustrating an embodiment of a method of arbitrating access to personal information.
Figure 2B:
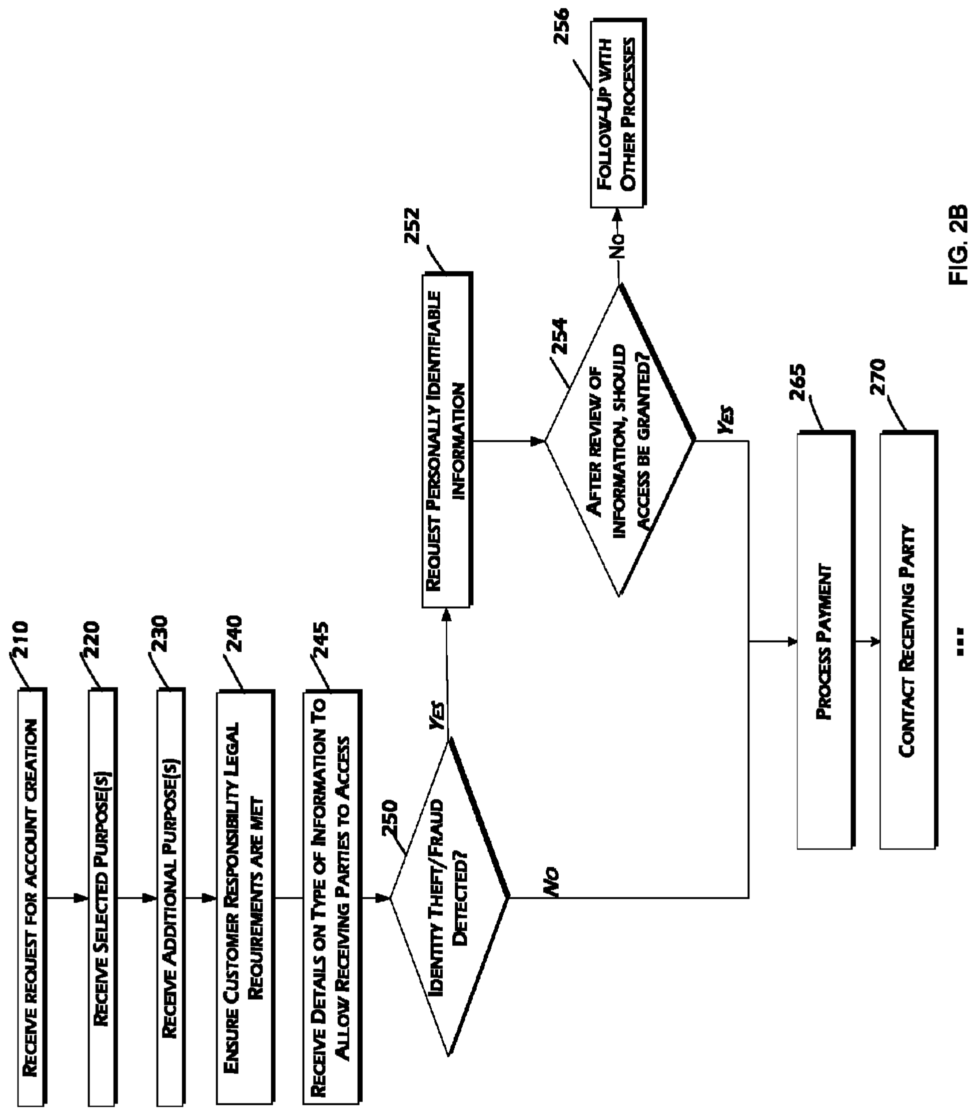
Figure 2C:
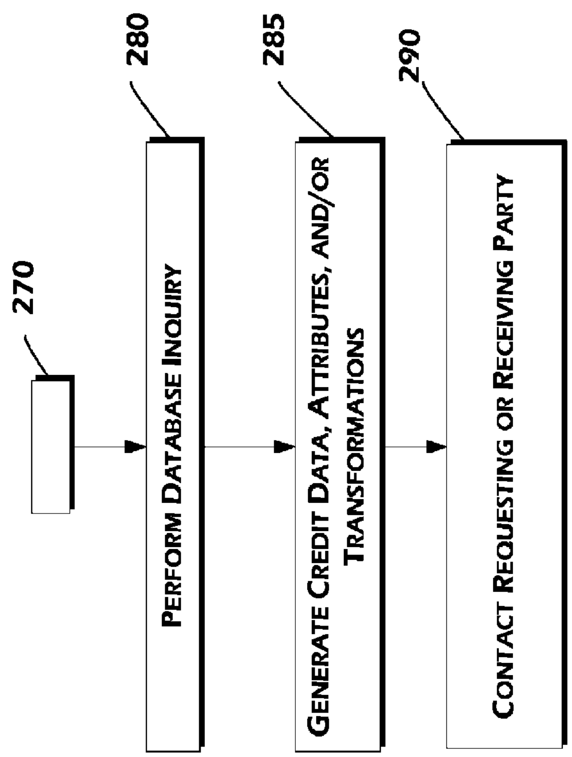

FIG. 2 (FIGS. 2A, 2B, and 2C) is a flowchart illustrating one embodiment of a method of arbitrating access to personal information of a permitting party. Depending on the embodiment, the method of FIG. 2 may include fewer or additional blocks and/or the blocks may be performed in a different order than is illustrated. Software code configured for execution on a computing device in order to perform the method of FIG. 2 may be provided on a computer readable medium, such as a compact disc, digital video disc, flash drive, or any other tangible medium. Such software code may be stored, partially or fully, on a memory device of the computer, such as the memory 130 (FIG. 1), in order to perform the method outlined in FIG. 2. For ease of explanation, the method will be described herein as performed by a PATS system 100; however, the method may be performed by any other suitable computing device.

FIG. 2A illustrates a first portion of the method, based on an initiation by a requesting party 164. Beginning in block 210, the PATS system 100 receives a request for account creation by a requesting party 164. In various embodiments, the request for account creation may include information about the requesting party 164 including one or more of: a name, an address, a date of birth, a driver's license number, a social security number, employer name, tax identification number, phone number, and the like. If the requesting party 164 has already established an account with the PATS system 100, block 210 may be simplified such that the requesting party 164 provides login/authentication information. For example, the requesting party 164 may provide a username and password that is usable by the PATS system 100 to identify the particular requesting party.

Next, in block 220, the PATS system 100 receives a selected purpose from the requesting party 164. In various embodiments, the selected purpose may be one or more of compatibility, assessment, authentication, legitimacy, validation, and the like. In one embodiment, the requesting party 164 establishes a default purpose for requesting personal information of other entities, such that block 220 may be skipped in requests for personal information by that particular requesting party 64. For example, a landlord may select a default purpose of determining credibility that should be used with subsequent request for personal information by the landlord using the PATS system 100.

Moving to block 230, the PATS system 100 may optionally receive an additional purpose. In various embodiments, the additional purpose may be that the data be used only for social networking purposes, for rental screening purposes, and the like. Additionally, the system 100 may receive details such as when the data is needed (for example, as a one-time transaction or as part of batch processing) and whether the data should be transformed in any way. In some embodiments, the requesting party 164 can provide preferences for one or more of the above tasks in blocks 220 and 230 such that those tasks may be automated using the requesting party 164's default preferences. Thus, blocks 220 and 230 may not be individually performed for each request from a requesting party 164.

Next, in block 240, the PATS system 100 ensures that the requesting party 164 complies with and accepts any legal requirements for customer responsibility. Such requirements may include one or more of: obtaining acceptance and an electronic signature from the requesting party 164, receiving payment details such as credit card information from the requesting party 164, or other legal consent information. The requesting party 164 may be asked by the system 100 to provide evidence of written instruction. Such written instruction may include an electronic signature as defined by the ESIGN Act, or any other method that governing bodies may approve as adequate proof.

The PATS system 100 may then use the payment details to process payment for the account creation fee. In some embodiments, the payment model for the PATS system 100 may be transactional. In other embodiments, it may be by batch. The payment method may be by credit, by debit, by PayPal™ account, and the like. Payment for a transaction may be received from the requesting party 164, from the permitting party 190, or both.

Next, in block 250, the PATS system 100 verifies whether there may be identity theft or some other form of fraud, based on the information received by the requesting party 164. The parties' identities may be verified using a variety of authentication and fraud detection techniques by the PATS system 100. Regardless of the result of this verification, the PATS system 100 may store the details of the transaction(s) with the requesting party 164 in a device such as mass storage device 120, for example, in order to enable comprehensive tracking of each transaction. The requesting party 164 may also be asked to affirmatively accept or reject clear and conspicuous instructions to support, defend or refute that the transaction was requested. Details of the transaction(s) may include IP address, transaction time, originating source (for example, member number, third party website/partner, and reseller identification), data with respect to the requesting party 164's actions (such as, for example, obligation and responsibilities acceptance, e-signature, and acknowledgments of instructions).

If the PATS system 100 detects identity theft or fraud, then, at block 252, the system 100 may request a fax of personally identifiable information from the requesting party 164, and any other information relating to the additional purpose received at block 230. If the system 100 receives such information (the system 100 may or may not receive such requested information) from the requesting party 164, then at block 254, the information is reviewed, and if the information is verified, the method continues to block 260. In one embodiment, if the information is verified (e.g., the requesting party is authenticated), a message with a traceable and/or encrypted message and/or link may be sent to the requesting party 164's location (which may be, for example, an email address, a social networking username, and/or a mobile phone reached by an SMS), where the link is usable to continue with the request for personal information. If the system 100 determines that the requesting party 164 cannot be authenticated based on the received information, or if personally identifiable information is not received, the method continues to block 256 where follow up with the requesting party 164 using standard membership processes for suspicious account handling may be performed.

If the PATS system 100 does not detect identity theft or fraud at block 250, or if there was a suspicion of theft or fraud but the personally identifiable information was verified at block 254, then, at block 260, the system 100 may receive information regarding the targeted permitting party 190 from the receiving party 164, as well as the type of product to request regarding the permitting party 190. In various embodiments, the information regarding the permitting party 190 may include one or more of the permitting party 190's email address, name, address, date of birth, driver's license number, employer name, income, and the like. In various embodiments, the type of information regarding the permitting party 190 that is requested may include one or more of: a credit score, a credit profile with a decision, a full credit profile with personally identifiable information removed, a credit profile with some information removed, information regarding the character of permitting party 190, and the like. In some embodiments, the authentication blocks 210-250 may be performed in another manner, possibly by another entity that specializes in authentication. Authentication performed by the PATS system 100 and/or the other entity may include one or more of several authentication techniques known to one skilled in the art. Thus, in some embodiments, a process of requesting personal information of an entity that is executed by the PATS system 100 begins with block 260 of FIG. 2A.

Next, at block 270, the PATS system 100 may use the details regarding the permitting party 190 to contact the permitting party 190. In some embodiments, the PATS system 100 may have access to further contact information regarding the permitting party 190 that may not be available to the requesting party 164. For example, the requesting party 164 may not have an e-mail address of the permitting party 190, but the PATS system 100 may determine the e-mail address of the permitting party 190 and communicate with the permitting party 190 via the e-mail address. For example, in a social networking scenario, the PATS system 100 may request and receive contact information of the permitting party from the social networking system, where the contact information is not available to requesting party 164. When the PATS system 100 communicates with the permitting party 190, information that at least partially identifies the requesting party 164 and details regarding the request are provided. In one embodiment, the permitting party 190 may initiate acceptance of the request by the requesting party 164, for example, by clicking an encrypted link, if received by email. In this way, the permitting party 190 may authorize or reject the request for information. In other embodiments, the permitting party may authorize/reject requests for access to personal information in any other manners, such as via a web interface, telephone call, email, or other means.

Next, at block 275, the permitting party 190 the permitting party may be given the ability to provide authorizations after being informed of a specific request for access to their information. The permitting party 190 may provide authorization to the system 100 for the requesting party 164 in any number of ways (including those discussed above). In some embodiments, the permitting party 190 may select portions of the requested information that the requesting party 164 is authorized to access.

In one embodiment, the permitting party 190 is also required to have an account with the PATS system 100, such as to authenticate that the permitting party really is the entity that the requesting party is seeking information from. Thus, the permitting party 190 may need to provide authentication information to the PATS system. For example, if the permitting party 190 has not previously set up an account with the PATS system 100, blocks 210-250, and if necessary, blocks 252-258, may be repeated for the permitting party 190. Depending on the embodiment, authentication of the permitting party 190 may be different than the required authentication for the requesting party 164. For example, the permitting party 190 may not need to provide as much authentication information as the requesting party 164, or vice versa.

During the set up of the account for the permitting party, or for a previously set-up account, the permitting party 190 may be asked at block 260 to provide permission for access to personal information, and to determine the type of information to make available to the requesting party 164. In various embodiments, the types of information available for request by the requesting party, and available to allow access to by the permitting party 190, may include one or more of: a credit score, a credit profile with a decision, a full credit profile with personally identifiable information removed, a credit profile with some information removed, and the like. Next, the method moves to block 280 (FIG. 2C) described further below.

FIG. 2B illustrates the first portion of the method based on an initiation by a permitting party 190, where personal information is to be made available to one or more receiving parties 184. Beginning in block 210, the PATS system 100 receives a request for account creation by a permitting party 190. In various embodiments, the request for account creation may include information about the permitting party 190 including one or more of: a name, an address, a date of birth, a driver's license number, a social security number, employer name, tax identification number, phone number, and the like.

Next, in block 220, the PATS system 100 receives a selected purpose from the permitting party 190. In various embodiments, the selected purpose may be one or more of compatibility, assessment, authentication, legitimacy, validation, and the like. In some embodiments, the PATS system 100 may also receive information from the permitting party 190 identifying one or more receiving parties 184 for which information may be made available. In other embodiments, the system 100 may receive information from the permitting party 190 identifying receiving parties 184 for which information may be restricted from being available.

Moving to block 230, the PATS system 100 may optionally receive an additional purpose. In various embodiments, the additional purpose may be that the data be used only for social networking purposes, for rental screening purposes, and the like. Additionally, the system 100 may receive details such as when the data is needed (for example, as a one-time transaction or as part of batch processing) and whether the data should be transformed in any way. In some embodiments, the permitting party 190 can provide preferences for one or more of the above tasks in blocks 220 and 230 such that those tasks may be automated using the permitting party 190's default preferences.

Next, in block 240, the PATS system 100 ensures that the permitting party 190 complies with and accepts any legal requirements for customer responsibility. Such requirements may include one or more of: obtaining acceptance and an electronic signature from the permitting party 190, receiving payment details such as credit card information from the permitting party 190, or other legal consent information. The permitting party 190 may be asked by the system 100 to provide evidence of written instruction. Such written instruction may include an electronic signature as defined by the ESIGN Act, or any other method that governing bodies may approve as adequate proof.

Then, in block 245, the PATS system 100 receives details about the type of information for which permission is granted by the permitting party 190 for the receiving part(ies) 184. In various embodiments, the type of product may include one or more of: a credit score, a credit profile with a decision, a full credit profile with personally identifiable information removed, a credit profile with some information removed, and the like.

Next, in block 250, the PATS system 100 verifies whether there may be identity theft or some other form of fraud, based on the information received by the permitting party 190. The parties' identities may also be verified using a variety of authentication and fraud detection techniques by the PATS system 100. Regardless of the result of this verification, the PATS system 100 may store the details of the transaction(s) with the permitting party 190 in a device such as mass storage device 120, for example, in order to enable comprehensive tracking of each transaction. The permitting party 190 may also be asked to affirmatively accept or reject clear and conspicuous instructions to support, defend or refute that the transaction was requested. Details of the transaction(s) may include IP address, transaction time, originating source (for example, member number, third party website/partner, and reseller identification), data with respect to the permitting party 190's actions (such as, for example, obligation and responsibilities acceptance, e-signature, and acknowledgments of instructions).

If the PATS system 100 detects identity theft or fraud, then, at block 252, the system 100 may request a fax of personally identifiable information from the permitting party 190, and any other information relating to the additional purpose received at block 230. If the system 100 receives such information from the permitting party 190, then at block 254, the information is reviewed, the method continues to block 260. In one embodiment, if the information is verified (e.g., the permitting party is authenticated), a message with a traceable and/or encrypted message and/or link may be sent to the permitting party 190's location (which may be, for example, an email address, a social networking username, and/or a mobile phone reached by an SMS), where the link is usable to further define details regarding access to the permitting party 190's personal information. If the system 100 determines that the permitting party 190 cannot be authenticated based on the received information, or if personally identifiable information is not received, the method continues to block 256 where follow up with the permitting party 190 using standard membership processes for suspicious account handling may be performed.

If the PATS system 100 does not detect identity theft or fraud at block 250, or if there was a suspicion of theft or fraud but the personally identifiable information was verified at block 254, then, at block 265, the PATS system 100 may use the payment details to process payment for the account creation fee, and/or for providing a product to a receiving party 184. In some embodiments, the payment model for the PATS system 100 may be transactional. In other embodiments, it may be by batch. The payment method may be by credit, by debit, by PayPal™ account, and the like. Payment for a transaction may be received by the requesting party 164, by the permitting party 190, or both. In some embodiments, the authentication blocks 210-250 may be performed in another manner, possibly by another entity that specializes in authentication. Thus, in some embodiments, a process of permitting use of personal information of an entity that is executed by the PATS system 100 begins with block 265 of FIG. 2B.

Next, at block 270, the PATS system 100 may contact one or more receiving party 184. In some embodiments, the PATS system 100 may have access to further contact information regarding the receiving party 184 that may not be available to the permitting party 190. For example, the permitting party 190 may not have an e-mail address of the receiving party 184, but the PATS system 100 may determine the e-mail address of the receiving party 184 and communicate with the receiving party 184 via the e-mail address. For example, in a social networking scenario, the PATS system 100 may request and receive contact information of the receiving party from the social networking system, where the contact information is not available to permitting party 190.

In one embodiment, the receiving party 184 is also required to have an account with the PATS system 100, such as to authenticate that the receiving party really is the entity to whom the permitting party has provided permission to access information. Thus, the receiving party 184 may need to provide authentication information to the PATS system. For example, if the receiving party 184 has not previously set up an account with the PATS system 100, blocks 210-250, and if necessary, blocks 252-258, may be repeated for the receiving party 184. Depending on the embodiment, authentication of the receiving party 184 may be different than the required authentication for the permitting party 190. For example, the receiving party 184 may not need to provide as much authentication information as the permitting party 190, or vice versa.

FIG. 2C is illustrates a second portion of the embodiment of a method of arbitrating access to personal information. Once the PATS system 100 has contacted the permitting party and received further authorizations if necessary at block 275 (FIG. 2A) or the receiving party at block 270 (FIG. 2B), then at block 280, the PATS system 100 performs a data structure inquiry to obtain the information requested by the requesting party 164 for which the permitting party 190 authorized access by the requesting party 164. In various embodiments, this data structure enquiry may include accessing data in internal credit data structure(s) 172 and/or one or more external data structure(s) 173.

Next, at block 285, the PATS system 100 generates credit bureau data, credit attributes, and/or transformation of such data in order to generate the a product including the information requested and/or permitted at blocks 245 or 260. In one embodiment, personal information is grouped into various products that may be authorized for release to requesting and/or permitting parties. For example, a credit report product may include the typical pieces of credit information, and information associated with the credit information, that is provided to consumers in credit reports. The type of information requested by a requesting party 164, and/or permitted by the permitting party 190 may vary. In some embodiments, the information may be, for example, header information included in a typical credit bureau report, which may be used for authentication. In other embodiments, the information may be, for example, a credit bureau profile, which may include the full profile, some credit scores, some credit attributes, and/or abstractions of the score and/or attributes.

In some embodiments, the information provide to requesting and/or receiving parties may be transformed from its original format. For example, an abstract representation of a credit score or decision may be rendered in the form of an expression, such as an icon that ranges from a smile to a frown, wherein the expression is representative of the credit score. For example, expressive face icons may be associated with credit score ranges so that a credit scores in the range of 780-820, for example, may be associated with a smiley face icon while credit scores in the range of 300-600 may be associated with a frowny face. Expressions may also include common connotations such as number of stars or degrees of moon fullness. Additionally, embodiments in the form of low-to-high scores and decisions may be abstracted in quantitative progressions, ranges and volumes and can be rendered as gauges, thermometers, speedometers and other meters, as well as in common chart formats such as pie charts, bar charts and sliders.

In yet other embodiments, the information may be demographics such as age, sex, location, and so forth. In some embodiments, the information may be education records. In other embodiments, the information may be public records such as liens and lawsuits, for example. In other embodiments, the information may be criminal records. In other embodiments, the information may include some other form of data and/or transformations of the other types of information listed above.

If the request for data comprises a soft inquiry, the permitting party 190 may acknowledge that they are sharing the result with the requesting party 164, and a transformed result (such as a score, for example, indicating a consumable grade such as "excellent") may be provided. If the request comprises a hard inquiry, the permitting party 190 may provide written authorization to the system 100 and by proxy to the requesting party 164. Such written authorization may need to conform to electronic standards for providing written authorization. A transformed result (such as a score for example, indicating a consumable grade such as "excellent") may be provided. In some embodiments, the information generated at block 285 may be provisioned to a location (for example, a secure server, an encrypted file mailbox, an access point, a message, or the like).

Finally, at block 290, the PATS system 100 may contact the requesting party 164, or the receiving party 184 to alert that they are authorized to access the generated information. In various embodiments, the system 100 may notify (for example, by encrypted email, or by short message service (SMS) message, or the like) the party that the information is available; require the party to acknowledge their obligations under law, if required, by affirming the singular purpose for the receipt of the information. The PATS system 100 may then allow the party to access the information at the provided location. In some embodiments, the access to the generated file (for example, the party's credit report) may be limited in time. The time limit may be 24 hours, or some other time limit that agreeably reduces the established and standard risk parameters.

Figure 3:
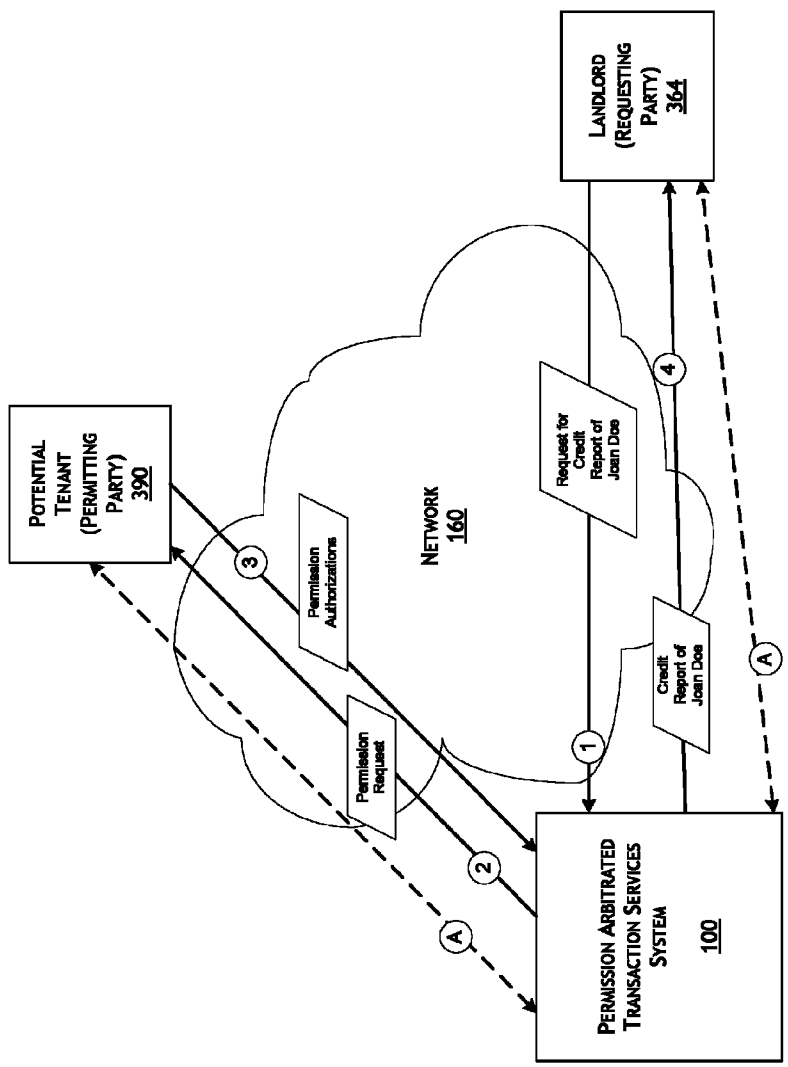
FIG. 3 illustrates one embodiment of the permission based transaction services system and the flow of data between the entities when a rental screening service is arbitrated.

The output provided by the PATS system 100 may depend on the type of service for which information is requested. FIG. 3 illustrates one embodiment of the permission based transaction services system and the flow of data between entities for tenant screening purposes. As seen in FIG. 3, for tenant screening services, (1) the landlord 364, as the requesting party, sends a request to the PATS system 100 via the network 160 for information regarding a potential tenant (e.g., a credit report of a potential tenant, Joan Doe). Then, (2) the PATS system 100 contacts, via the network 160, a potential tenant, as a permitting party 190, to receive permission to send information regarding the potential tenant 390 to the landlord 364. Then, (3) the potential tenant 390, via the network 160, provides permission to the PATS system 100 to send or otherwise provide access to the information to the landlord 364. The potential tenant 390 may decide to provide no or a limited amount of the requested information. For example, the potential tenant 390 may authorize the landlord 364 to access only a credit report including Personal Information, Profile Summary, Score Summary, Public records, or an extract of the credit report and score, and/or a decision. For example, the PATS system 100 may include, or may have access to logic provided by another entity, to analyze certain personal information of the potential tenant and provide an indicator of a recommended decision for the landlord 364, such as, for example, approve, refer, and/or decline based on the property manager's established parameters. Such decision logic may have various options for customization by the landlord 364, such as based on the landlords willingness to risk entering into an agreement with an unsuitable tenant. In one embodiment, the PATS system 100 may suppress certain personally identifiable information of the tenant 390 (either by default or by specific request by the potential tenant 390), such as social security number and detailed tradeline data from being returned in the output to the landlord 364. Based on the permissions authorized by the potential tenant, in step (4) the PATS system 100 returns to the landlord 364 only the information permitted by the potential tenant 390.

The example of FIG. 3 also illustrates authentication steps (labeled with "A") between the PATS system 100 and both of the potential tenant 390 and the landlord 364. As discussed above, some level of authentication of both the permitting party and the requesting party may be required. Various authentication techniques may be used, such as those illustrated and discussed with reference to FIG. 2. Authentication may occur prior to steps 1-4 discussed above and/or at other points between or during completion of the steps. For example, the landlord 364 may need to provide authentication information before providing the request for the credit report of Joan Doe, and may be required to again provide authentication information after permission has been granted by Joan Doe and prior to accesses the information.

In another embodiment, such as for example for hiring and employment services, the data output may include a credit report including Personal Information, Profile Summary, Score Summary, Public Records, or an extract of the credit report, and a credit score, and/or a decision (such as for example, hire, do not hire, based on the employer's established parameters). In some embodiments, the output may include only a credit score, or a transformation of a credit score into another abstraction.

Figure 4:
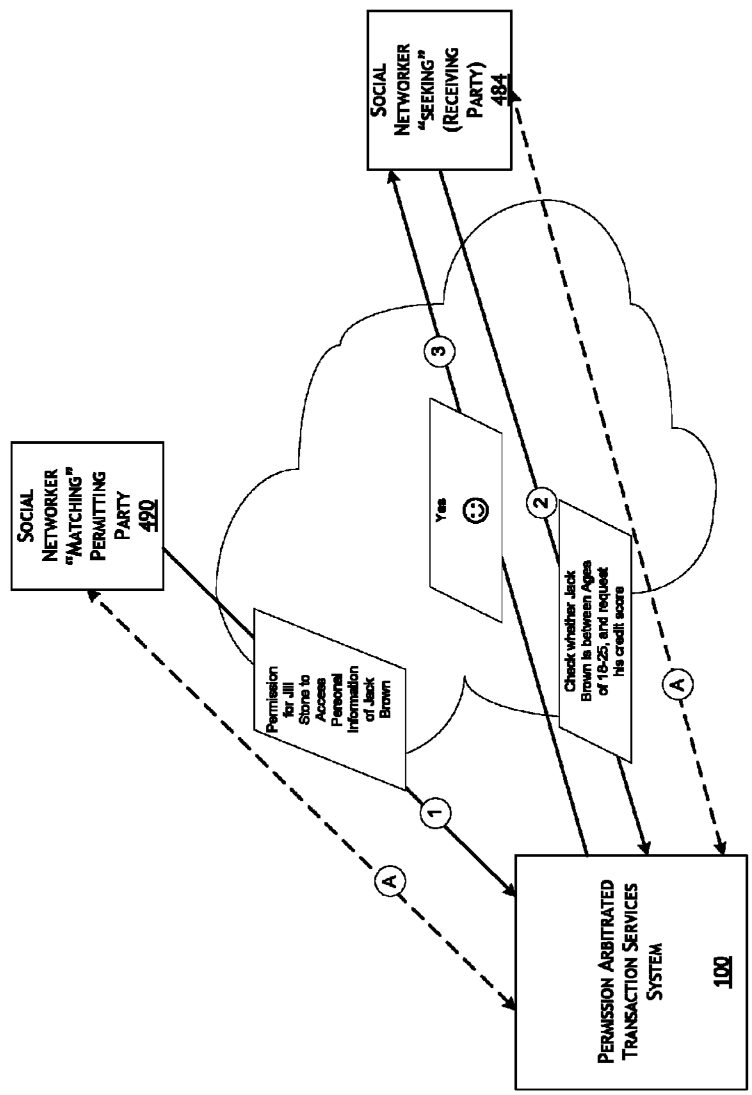
FIG. 4 illustrates another embodiment of the permission based transaction services system and the flow of data between the entities when a social networking service is arbitrated.

FIG. 4 illustrates another embodiment of the permission based transaction services system and the flow of data between the entities when a social networking service is arbitrated. As seen in FIG. 4, for social networking services, (1) a social networker, such as for example Jack Brown, as a permitting party 490, sends permission to the PATS system 100 via the network 160 to share information regarding his age, or other demographic information with other social networkers which may be seeking a social networker to match some criteria. The social networker 490 may decide to provide no or a limited amount of information. For example, the social networker 490 may authorize other seeking social networkers, as receiving parties 484, to only receive the information transformed from its original format, such as an indication of the other social networker's compatibility with Jack Brown. Then, (2) the PATS system 100, via the network 160, may receive from a social networking seeker 484, such as Jill Stone, some criteria of interested age or demographics of Jack Brown. For example, Jill may ask request an age check, and may submit a parameter such as "age between of 18-25" for Jack, also request to know Jack's credit score, and possibly an indication of compatibility with Jack. The PATS system 100 may then (3) send, via the network 160, information regarding the social networker 490, Jack Brown. In one embodiment, Personally Identifiable Information (including for example name, address, phone number, Social Security Number, and/or Driver's License Number), Score Summary, Profile Summary, or Detailed Tradeline data is not delivered to Jill. In some embodiments, the output may include a matching capability in which receiving parties receive a "yes/no" match to the parameters or criteria they enter. The response from the PATS system 100 at (3) may be "Yes" if Jack's profile includes Age of 18-25, "No" if not between 18-25, and "N/A" if unknown. Another example may include a request for compatibility (e.g., financial or social compatibility) where Jill submits a parameter of "excellent" credit to be matched, and the PATS system 100 returns a smiley face, wherein the smiley face is representative of Jack's credit score or possibly an indication of a match between Jacks personal information (e.g., Jack's credit score or some information derived from Jack's personal information, such as a financial stability indication) and criteria provided by Jill Stone.

The example of FIG. 4 also illustrates authentication steps (labeled with "A") between the PATS system 100 and both of the social networkers 490 and 484. As discussed above, some level of authentication of both the permitting party and the receiving party may be required. Various authentication techniques may be used, such as those illustrated and discussed with reference to FIG. 2. Authentication may occur prior to steps 1-3 discussed above and/or at other points between or during completion of the steps.

In another embodiment, for search of caregiver services, the data output may include a consumer report including Personal Information, Score Summary, and/or Public Records. The permission arbitrated transaction services system may suppress information such as the party's social security number and detailed Tradeline data from being returned in the output. In some embodiments, the output may include a transformation of a credit score into another abstraction (such as, for example a red, yellow or green symbol or icon), and/or a transformation of public records into another abstraction (such as for example, red, yellow or green symbol or icon).

In another embodiment, for electronic exchanges, the output may comprise authentication, credit and public record data that is returned in transformed format.

Embodiments of the permission arbitrated transaction services systems and methods disclosed herein may also provide a framework in which commercial parties such as developers, application engineers, and the like, build independent applications and services leveraging the PATS system 100 data, and the commercial parties may deliver those applications and services to their customers.

Embodiments of the permission arbitrated transaction services systems and methods disclosed herein may comprise a component based framework developed to meet the needs and opportunities of a multitude of international markets, localized for regulatory rules. For example, the framework may be developed for the United States market in compliance with the Fair Credit Reporting Act (FRCA). The framework may also be developed for the United Kingdom, for example, in compliance with the Data Protection Act (DPA).

The permission arbitrated transaction services systems and methods disclosed herein may support credit bureau businesses and websites, personal connection websites (such as Facebook, MySpace, and the like), matchmaking sites (such as eHarmony®, match.com®, and the like), employment-relates sites (such as LinkedIn®, ZoomInfo, and the like), people search sites (such as RapLeaf, Pipl, and the like), communications services (such as Skype™, and the like), mobile telephony platforms, tenant screening companies, credit reporting companies, and/or other businesses to enable two or more people or entities to exchange personal information in an arbitrated, secure manner, quickly, easily and safely.

The systems and methods disclosed herein may also support doctors, lawyers, small retailers, and other parties wishing to initiate permissible purpose requests for credit or other related variables for purposes of making business decisions.

Some of the contemplated benefits of some embodiments of permission arbitrated transaction services systems and methods include the ability to provide end users with assessment of their connections before getting too involved with them in a fast, inexpensive and reliable manner; the ability to provide delivery channel partners with a complementary value add service to their constituents as well as an additional source of revenue; the ability to provide credit bureaus with scaled enablement for distribution of credit data, collection of proof of life data on consumers, additional revenue sources, leveraging of other business assets.

SUMMARY

All of the processes described above may be embodied in, and fully automated via, software code modules executed by one or more general purpose computers. The code module may be stored in any type of tangible computer-readable medium or other computer storage device. A tangible computer readable medium is a data storage device that can store data that is readable by a computer system. Examples of computer readable mediums include read-only memory, random-access memory, other volatile or non-volatile memory devices, CD-ROMs, magnetic tape, flash drives, and optical data storage devices. Some or all of the methods may alternatively be embodied in specialized computer hardware. As will be apparent, the features, and attributes of the specific embodiments disclosed above may be combined in different ways to form additional embodiments, all of which are fall within the scope of the present disclosure. Although this disclosure has been described in terms of certain preferred embodiments and applications, other embodiments and applications that are apparent to those of ordinary skill in the art, including embodiments which do not provide all of the features and advantages set forth herein, are also within the scope of this disclosure.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure. The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

The invention claimed is:

1. An arbitration entity computer system comprising:

a hardware processor; and a memory storing a plurality of processing instructions configured for execution by the hardware processor in order to cause the arbitration entity computer system to:

receive, by the arbitration entity computer system, from at least one requesting party a request for personal information about a permitting party, wherein the request includes one or more types of personal information and a purpose for the personal information;

receive, by the arbitration entity computer system, first authentication information from the at least one requesting party;

receive, by the arbitration entity computer system, second authentication information from the permitting party;

authenticate, by the arbitration entity computer system, identities of the at least one requesting and permitting parties based on the authentication information received from the at least one requesting and permitting parties;

send a request, by the arbitration entity computer system, to the permitting party, the request asking the permitting party for permission to provide the personal information requested by each of the requesting parties;

receive, by the arbitration entity computer system, permission from the permitting party to provide at least some of the personal information requested by each of the requesting parties, wherein the permission indicates one or more types of personal information for which access is not granted for each requesting party;

access, by the arbitration entity computer system, personal information of the permitting party that is of the one or more requested type; and prepare, by the arbitration entity computer system, a separate set of output data for each of the requesting parties based on the respective purpose for the information, wherein an entity controlling the arbitration entity computer system is separate from the requesting parties and the permitting party.

2. The arbitration entity computer system of claim 1, wherein the one or more types of personal information comprises at least one of credit information, demographic information, and criminal background.

3. The arbitration entity computer system of claim 1, wherein the purpose for the personal information comprises at least one of compatibility between the permitting and requesting parties, assessment of the permitting party's character, authentication of the permitting party's identity, legitimacy of information provided by the permitting party, and validation of information provided by the permitting party.

4. The arbitration entity computer system of claim 1, wherein, for a first purpose for the personal information, the output data comprises a transformation of the personal information.

5. The arbitration entity computer system of claim 4, wherein the transformation comprises truncating the personal information.

6. The arbitration entity computer system of claim 4, wherein the transformation comprises an abstraction of the personal information.

7. The arbitration entity computer system of claim 6, wherein the personal information comprises a credit score.

8. The arbitration entity computer system of claim 7, wherein the abstraction comprises an expression representative of the credit score.

9. The arbitration entity computer system of claim 8, wherein the expression comprises an icon that ranges from a smile to a frown.

10. The arbitration entity computer system of claim 4, wherein the transformation comprises an indication of whether the permitting party would be a suitable tenant or an indication of whether the permitting party would be romantically compatible with the respective requesting party.

11. The arbitration entity computer system of claim 10, wherein the transformation is based on a default algorithm that is based on one or more attributes of the permitting party that are not publicly available.

12. The arbitration entity computer system of claim 10, wherein the transformation is customizable by the respective requesting party.

13. A method comprising:

receiving, at an arbitration entity computing device, at least one request for personal information about a permitting party, wherein the at least one request includes one or more types of information and an intended use of the personal information by at least one requesting party;

receiving, by the arbitration entity computer system, authentication information from the at least one requesting party;

receiving, by the arbitration entity computer system, authentication information from the permitting party;

authenticating, by the arbitration entity computer system, identities of the at least one requesting and permitting parties based on the authentication information received from the at least one requesting and permitting parties;

sending, from the arbitration entity computing device, a request for permission to the permitting party;

receiving permission by the arbitration entity computing device, from the permitting party, to provide the at least one requesting party access to at least some of the requested personal information, wherein the permission indicates one or more portions of the requested personal information for which access is not granted for each requesting party;

accessing, by the arbitration entity computing device, the one or more portions of the requested personal information of the permitting party; and providing, by the arbitration entity computing device, a separate set of at least some of the accessed personal information to each of the requesting parties based on a respective purpose for the information, wherein an entity controlling the arbitration entity computing device is separate from the requesting party and the permitting party.

14. The method of claim 13, further comprising:

authenticating the permitting party;

authenticating the at least one requesting party; and providing the separate set of at least some of the accessed personal information to each requesting party only after authenticating the at least one requesting and permitting parties' identities by determining that there is no identity theft or fraud.

15. The method of claim 13, wherein the permitting party comprises a potential tenant, and the at least one requesting party comprises a landlord.

16. The method of claim 13, wherein the permitting party comprises a first social networker, and the at least one requesting party comprises at least one second social networker seeking personal information regarding the first social networker.

17. The method of claim 13, further comprising receiving, by the arbitration entity computing device, from the permitting party, restrictions on an amount of personal information to provide to each requesting party.

18. An arbitration entity computer system for authenticated transactions, comprising:

a processor; and a memory in communication with the processor, the memory for storing a plurality of processing instructions for directing the processor to:

receive, by the arbitration entity computer system from a permitting party, permission to provide at least some personal information about the permitting party to one or more receiving parties having attributes provided by the permitting party, wherein the permission indicates one or more types of the personal information for which access is not granted;

receive, by the arbitration entity computer system, authentication information from the one or more requesting parties;

receive, by the arbitration entity computer system, authentication information from the permitting party;

authenticate, by the arbitration entity computer system, identities of the one or more requesting and permitting parties based on the authentication information received from the one or more requesting and permitting parties;

access, by the arbitration entity computer system, the one or more types of the personal information about the permitting party;

transform, by the arbitration entity computer system, the accessed one or more types of personal information about the permitting party based on a purpose for the information for each requesting party; and send, by the arbitration entity computer system, the transformed personal information to one or more of the permitting party, a third party, a credit bureau, an information service provider, a financial institution or a party that stores personal information on the permitting party, wherein a separate set of the transformed personal information is accessible to each of the requesting parties having the attributes provided by the permitting party, wherein an entity controlling the arbitration entity computer system is separate from the one or more requesting parties and the permitting party.

19. The arbitration entity computer system of claim 18, wherein the attributes include one or more of a name of an individual, a name of a company, a location, or an intended use of personal information.

20. The arbitration entity computer system of claim 18, wherein the processor transforms the personal information by providing an abstraction representative of the personal information.

21. The arbitration entity computer system of claim 20, wherein the abstraction comprises an icon.

22. The arbitration entity computer system of claim 1, wherein the one or more types of personal information comprises at least one of: a credit score, a credit profile with a decision, a full credit profile with personally identifying information removed, a credit profile with some information removed or information regarding the character of the permitting party.

* * * * *